United States Patent
Muramatsu et al.

(10) Patent No.: US 8,534,971 B2
(45) Date of Patent: Sep. 17, 2013

(54) CLIP

(75) Inventors: Atsushi Muramatsu, Toyohashi (JP); Yuuki Aoshima, Toyohashi (JP); Hideo Marui, Toyohashi (JP); Junji Adachi, Ichinomiya (JP)

(73) Assignee: Newfrey LLC, Newark, DE (US)

( * ) Notice: Subject to any disclaimer, the term of this patent is extended or adjusted under 35 U.S.C. 154(b) by 241 days.

(21) Appl. No.: 12/966,253

(22) Filed: Dec. 13, 2010

(65) Prior Publication Data

US 2011/0150597 A1 Jun. 23, 2011

(30) Foreign Application Priority Data

Dec. 18, 2009 (JP) .................................. 2009-287468

(51) Int. Cl.
*F16B 13/06* (2006.01)

(52) U.S. Cl.
USPC .................................. 411/45; 411/21; 411/22

(58) Field of Classification Search
USPC .............. 411/21, 22, 45, 46, 47, 48, 51, 57.1, 411/63, 508
See application file for complete search history.

(56) References Cited

U.S. PATENT DOCUMENTS

| 958,127 | A | * | 5/1910 | Hovrud | 52/160 |
| 2,502,267 | A | * | 3/1950 | McPherson | 411/22 |
| 4,898,493 | A | * | 2/1990 | Blankenburg | 403/326 |
| 4,927,287 | A | * | 5/1990 | Ohkawa et al. | 403/408.1 |
| 4,953,269 | A | * | 9/1990 | Ragsdale | 24/704.1 |
| 5,211,519 | A | * | 5/1993 | Saito | 411/45 |
| 5,370,484 | A | * | 12/1994 | Morikawa et al. | 411/48 |
| 5,641,255 | A | | 6/1997 | Tanaka | |
| 5,775,860 | A | * | 7/1998 | Meyer | 411/46 |
| 2008/0298925 | A1 | * | 12/2008 | Shinozaki | 411/48 |

FOREIGN PATENT DOCUMENTS

| JP | 56-095605 S | 7/1981 |
| JP | 62-266212 S | 11/1987 |

* cited by examiner

*Primary Examiner* — Roberta Delisle
(74) *Attorney, Agent, or Firm* — Michael P. Leary

(57) ABSTRACT

A plurality of pin legs descends from a pin flange, pin leg through holes and pin acceptance cavities are formed in a bushing flange and bushing leg, leg spreaders are formed in the tip ends of the bushing leg, first locks are formed in the tip ends of the pin legs, for latching on permanent fastening projections of the leg spreaders so as to maintain the pin legs that have been diametrically spread by the leg spreaders in a permanently coupled condition, and second locks are formed at positions different from those of the first locks, for latching on temporary fastening projections in the bushing leg, whereupon the pin leg through holes restrain the diametrical spreading of the pin legs in the radial direction so that the tip ends of the pin legs can be inserted into the attachment holes of the members being attached to.

8 Claims, 13 Drawing Sheets

CLIP

CROSS-REFERENCE TO RELATED APPLICATIONS

This application claims priority from Japanese Patent Application No. 2009-287468, filed on Dec. 18, 2009, the disclosure of which is incorporated herein by reference.

The present invention relates to a clip comprising a bushing having a flange and a leg and a pin with both legs inserted into the bushing and a flange of larger diameter than the legs, designed so that the legs of the bushing, to which the pin is coupled, are inserted into holes in a plurality of members being attached to; the pin is further inserted into the bushing to diametrically spread the legs; the plurality of members being attached to are then clamped by the diametrically spread leg portion and flange thereof, and those members being attached to are mutually coupled.

BACKGROUND TECHNOLOGY

As described in Japanese Unexamined Util. Mod. Application No. S56-095605, Japanese Unexamined Pat. Application No. S62-266212/1987 and U.S. Pat. No. 5,641,255, also known as Japanese Patent Publication H8-004733/1996, hereinafter referred to as Patent Literature Nos. 1, 2 and 3, clips are commonly known which comprise a bushing having a flange and a leg, and a pin with legs that are inserted into the bushing and a flange of larger diameter than the legs, designed so that the legs of the bushing to which the pin is coupled are inserted into holes in a plurality of members being attached to, such as panels, and the pin is further inserted into the bushing to diametrically spread the legs; the plurality of members being attached to are then clamped by the diametrically spread leg portion and flange thereof, and those members being attached to are mutually coupled.

In a clip described in Patent Literature 1, the pin legs are bifurcated. When the pin legs in this bifurcated shape are inserted into the hollow portion of a bushing leg, the pin legs are opened and diametrically spread by a wedge-shaped leg spreader formed at a medium height position in the hollow portion of the bushing leg, the plurality of members being attached to are clamped between the bushing flange and the diametrically spread pin legs, and those members being attached to are mutually coupled. In a clip described in Patent Literature 2, a latching leg that forms a bushing is accommodated inside a divided leg portion of a pin, and at the lower end of the latching leg, a wedge-shaped leg spreader is formed. When the pin legs are inserted into the holes in a plurality of members being attached to, the flange of the head of the latching leg forming the bushing comes up flush against a member being attached to, the insertion of the latching leg inserted together with the pin stops, the pin legs that are being inserted are opened and diametrically spread by the wedge-shaped leg spreader of the bushing (latching leg), the plurality of members being attached to are clamped between the pin flange and the diametrically spread pin leg, and the members being attached to are mutually coupled. With these clips described in Patent Literature 1 and 2, the pin leg is rendered into a diametrically spread condition by the leg spreader of the bushing, so when the coupled condition persists for a long time, the pin leg cannot return to the original closed-leg condition but is thoroughly deformed into the diametrically spread condition. This is believed to be a consequence of the fact that the pin exhibits deformation due to a phenomenon called "stress relaxation." When deformation caused by stress relaxation occurs, a spring force operates to return the deformation to the original attitude. When the clips of Patent Literature 1 and 2 are reused, for example, an operation must be performed that requires force to return the deformation to the original attitude, time and effort are required for the refastening operation, and, in most cases, reuse or refastening is very difficult.

The clip described in Patent Literature 3 is configured of a plastic bushing which has a flange and legs and is formed so as to be hollow. The bushing legs are inserted into the holes of a plurality of members being attached to such as panels, the pin leg is inserted into the hollow leg of the bushing from the bushing flange end, the bushing legs are then diametrically spread, and the plurality of members being attached to are clamped and mutually coupled by the bushing flange and the diametrically spread bushing leg portion. With the members being attached to in the coupled condition, as described above, the pin leg is inserted into the bushing legs, the tip ends of the bushing legs are maintained in a diametrically spread condition, and that deformation is maintained in the diametrically spread condition by the deformation (called clip deformation in Patent Literature 3) caused by stress relaxation, after a long-term coupling. With the clip of Patent Literature 3, when the bushing legs are formed of a plurality of split pieces, a hole is provided at the tip end of the pin legs for accepting the tip ends of the bushing legs, and the bushing legs are to be pulled out after a long-term coupling, the tip ends of the bushing legs are accepted into the hole at the tip end of the pin legs, the diameter of the diametrically spread bushing leg portion is diametrically compressed while pulling the pin legs out, clip detachment is facilitated, and the deformation caused by the stress relaxation of the bushing legs is handled. With this clip, however, the shape of the tip ends of the pin legs becomes complex because of the hole that is formed for accepting the tip ends of the bushing legs. Furthermore, when the bushing legs are deformed by stress relaxation, acceptance of the tip ends of the bushing legs into the pin leg hole is not guaranteed, so there is a danger of not achieving the desired advantage.

In view of the foregoing, an object of the present invention is to provide a reusable clip which does not require the pin to be of a complex shape and which is capable of overcoming deformation caused by stress relaxation.

BRIEF SUMMARY

In order to attain the object stated above, the clip relating to the present invention is a clip comprising a bushing having a flange and a leg descending from the flange and a pin with both legs inserted into the bushing and a flange of larger diameter than the legs; to which a plurality of members being attached to is mutually coupled when the legs of the bushing to which the pin is temporarily coupled are inserted into that plurality of members being attached to, and the pin is further inserted into the bushing to bring about a permanent coupled condition with the legs diametrically spread; the members being attached to are then clamped by the diametrically spread leg portions and the flange; wherein, from the pin flange, the pin legs, plural in number, descend at intervals and are capable of diametrically spreading outwardly in the radial direction at the respective tip ends; in the bushing flange and the bushing legs, through holes and cavities into which a plural number of the pin legs is inserted are formed, respectively matched with the number of the pin legs; at the tip ends of the bushing legs, a leg spreader is formed for causing the bushing legs to bulge outwardly in the radial direction, rendering each of the pin legs inserted in the cavities into a diametrically spread condition; in the tip ends of the pin legs, a first lock is formed for latching onto a permanent fastening projection provided in the leg spreader for the bushing legs, so as to maintain the tip ends of the pin legs, which have been inserted into the cavities of the bushing legs, in a permanent coupled condition, diametrically spread by the leg spreader; in the tip ends of the pin legs, at a position different from the first lock, a second lock is formed for latching onto a temporary fastening projection provided in the through holes of the bushing legs, so as to temporarily couple the tip ends of the pin legs inserted in the through holes of the bushing flange, either in the through holes or at the portion of the cavities that are adjacent to the through holes; provision is thereby made so that the legs of the bushing to which the pin is temporarily coupled can be inserted into the attachment holes of members being attached to, and also so that the pin legs can be inserted into the hollow pins of the bushing legs and pressed into the permanently coupled condition; the through holes of the bushing flange are of a size that restrains diametrical spreading in the radial direction so that the tip ends of the pin legs can, respectively, be inserted into the attachment holes of the members being attached to.

As described above, the first lock of the pin legs is latched by the permanent fastening projection of the leg spreader of the bushing leg, maintaining the permanently coupled condition, whereby the plurality of members being attached to can be mutually coupled. Even if the permanently coupled condition is maintained for a long time and the pin legs are deformed in the diametrically spread condition by stress relaxation, the pin legs can be constrained to the original attitude prior to deformation by being returned to the temporarily coupled condition with the second lock latching on the temporary fastening projection of the bushing leg. Consequently, the pin can be pulled out together with the bushing from the members being attached to; the coupling of the members being attached to can then be released, and when the clip is subsequently reused, the tip ends of the pin legs inserted into the bushing leg will be constrained to the condition prior to the development of deformation due to stress relaxation. Therefore, as with pin legs that have not been diametrically spread and deformed, prior to permanent coupling, there will be no catching or snagging on the attachment holes, the clip can be attached without requiring close attention during insertion, and there need be no further concern regarding insertion mistakes, bushing leg damage or damage to the attachment holes of the members being attached to. The clip can be used repeatedly, converting back and forth between the permanently coupled condition and the temporarily coupled condition without any problem.

In the clip described above, the through holes of the bushing flange and the temporary fastening projection are formed in shapes such that, even if the tip ends of the pin legs inserted into the through holes are deformed so as to diametrically spread outwardly in the radial direction, the pin legs are forced to flex inwardly in the radial direction; when the pin legs in the permanently coupled condition are returned to their positions in the temporarily coupled condition, the tip ends of the pin legs deformed by stress relaxation are then restored to their previous condition prior to that deformation. In the through holes of the bushing flange, a temporary fastening maintaining projection is formed for latching to the first lock of the pin legs in the temporarily coupled condition, so that the pin will not pull out from the bushing and be released from the temporarily coupled condition and the temporary fastening projection of the bushing flange is formed at a different position from the temporary fastening maintaining projection in a shape such that insertion of the pin legs to the second lock of the pin legs is not obstructed.

There are three pin legs and three each of the through holes of the bushing flange and of the cavities of the bushing legs are formed, matching the number of the pin legs. The first lock and the second lock are provided, respectively, in the pin legs, and the temporary fastening maintaining projection and the temporary fastening projection of the bushing are provided in at least one of the through holes of the bushing. In the through holes of the bushing, pin leg insertion guides are formed for wide opening the entrances of the through holes and facilitating insertion of the pin legs into the through holes.

Furthermore, a recess is formed in the bushing flange for accommodating the pin flange when in the permanently coupled condition, and between the bushing flange and the pin flange in the recess, a gap is formed into which the tip end of a tool can be wedged.

BRIEF DESCRIPTION OF THE DRAWINGS

FIG. 12 is a plan of the clip diagrammed in FIG. 9, when clamping a first member being attached to and a second member being attached to.

FIG. 14 is a section like that in FIG. 10 of the clip diagrammed in FIG. 13, with the pin pulled up to the temporarily coupled condition from the condition of in which it was fastened to the members being attached to.

FIG. 16 is a section of the clip diagrammed in FIG. 14 representing the refastening operation, with a second member being attached to having an attachment hole of smaller diameter than that of the first member being attached to superimposed on said first member being attached to.

PREFERRED EMBODIMENTS OF THE INVENTION

Figure 11:
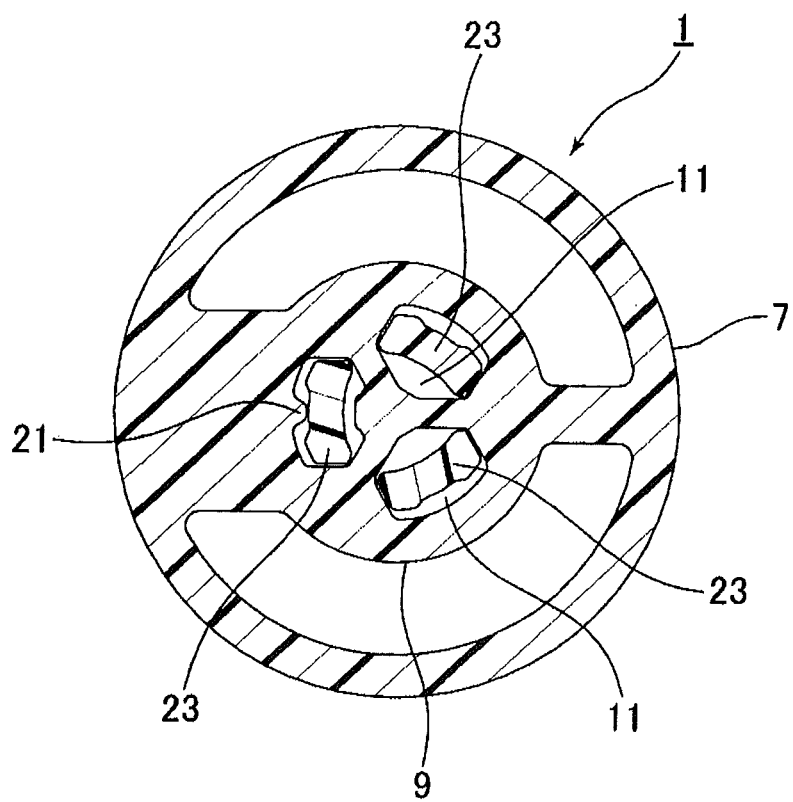
FIG. 11 is a section of the clip, at the I-I line, diagrammed in FIG. 10.
Figure 12:
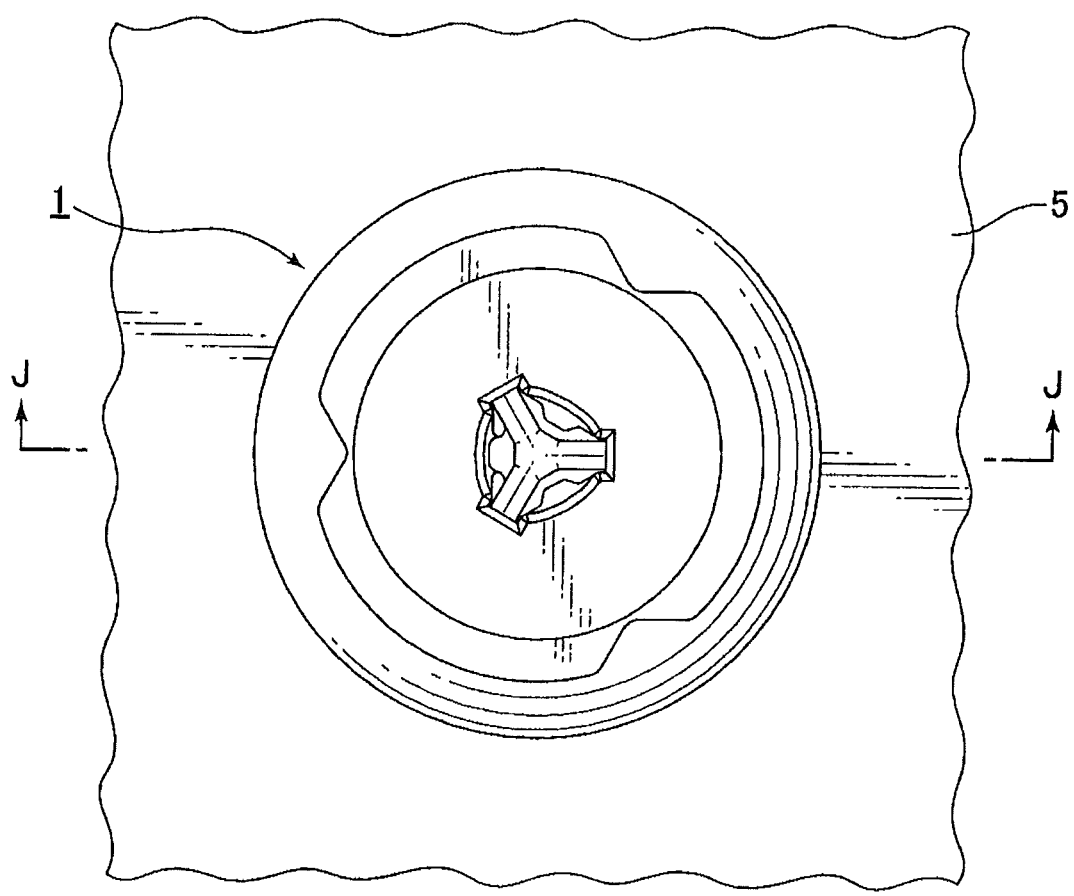
Figure 13:
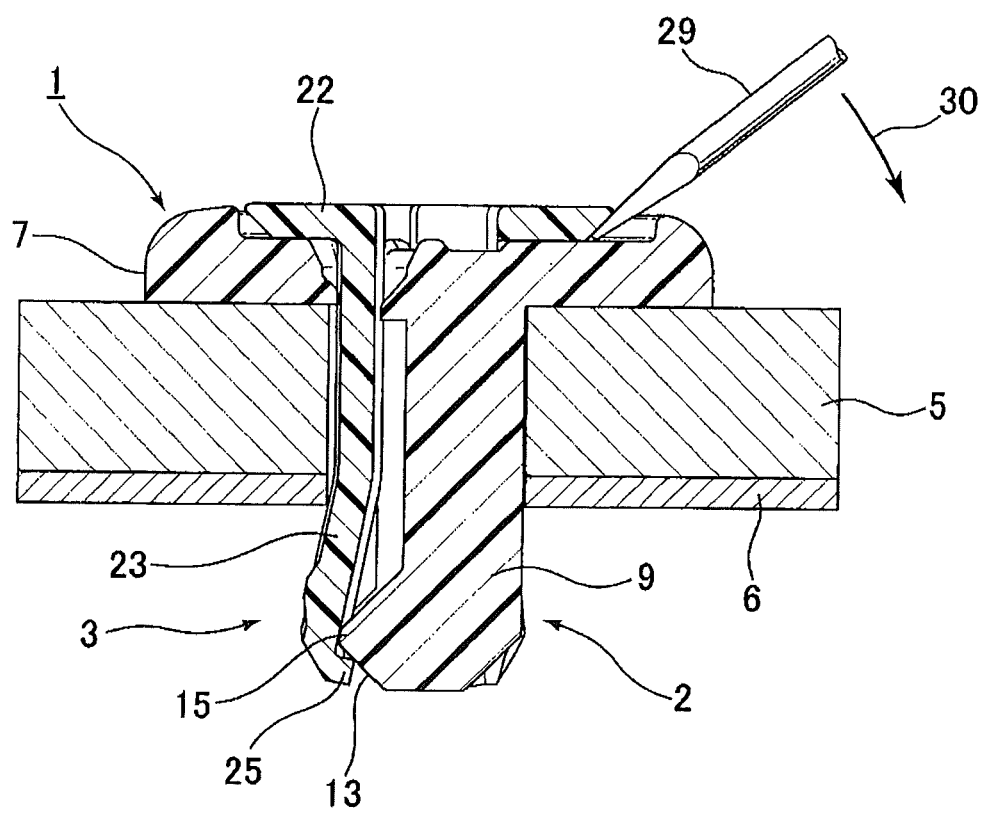
FIG. 13 is a section of the clip, the first member being attached to and second member being attached to as diagrammed in FIG. 12, at the J-J line.

Embodiments of the present invention shall now be described with reference to the drawings. The bushing 2 of a clip 1 relating to one embodiment of the present invention is diagrammed in FIGS. 1 to 5. The pin 3 of the clip 1 relating to the one embodiment of the present invention is diagrammed in FIGS. 6 to 8. The clip relating to the one embodiment of the present invention is diagrammed in FIGS. 9 to 11 in a temporarily coupled condition. In FIGS. 12 and 13, the clip 1 is diagrammed, permanently coupled to a first member being attached to 5 and second member being attached to 6, with the clip 1 fastened to the members being attached to so that both members being attached to are mutually coupled. FIGS. 14 to 17 diagram how the clip 1 can easily be refastened to the first member being attached to 5 and to a second member being attached to 6A that has a smaller attachment hole, even when the pin legs of the pin 3 of the clip 1 have sustained deformation due to stress relaxation.

Figure 4:
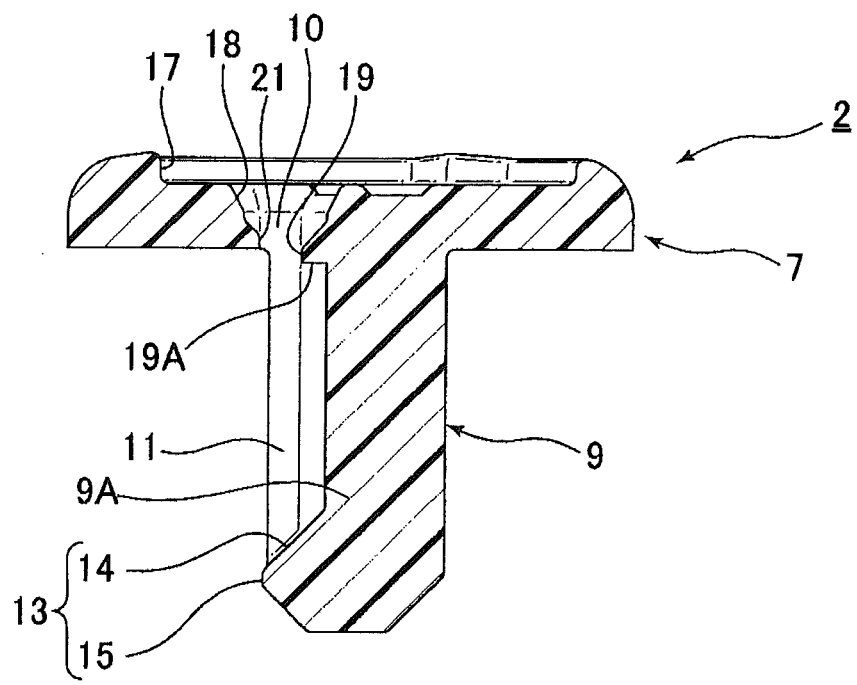
FIG. 4 is a section of the bushing, at the A-A line, diagrammed in FIG. 2.
Figure 5:
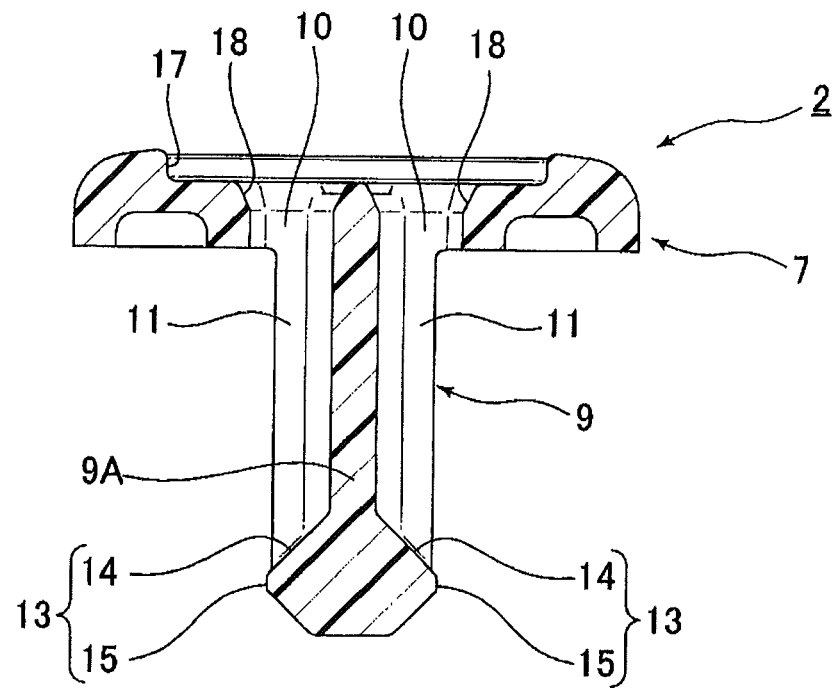
FIG. 5 is a section of the bushing, at the B-C-D lines, diagrammed in FIG. 2.
Figure 6:
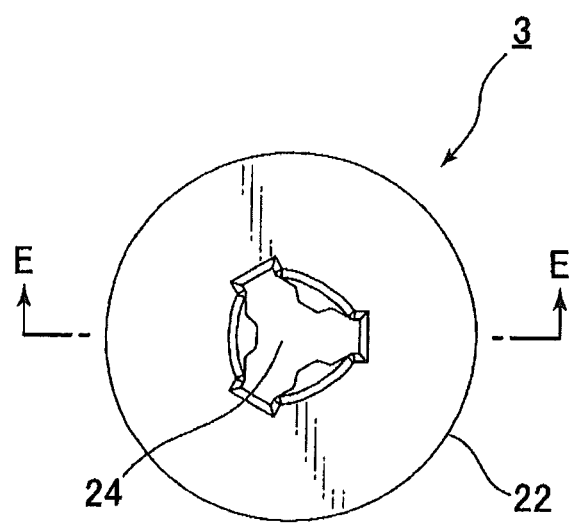
FIG. 6 is a plan of a pin in a clip relating to one embodiment of the present invention.
Figure 7:
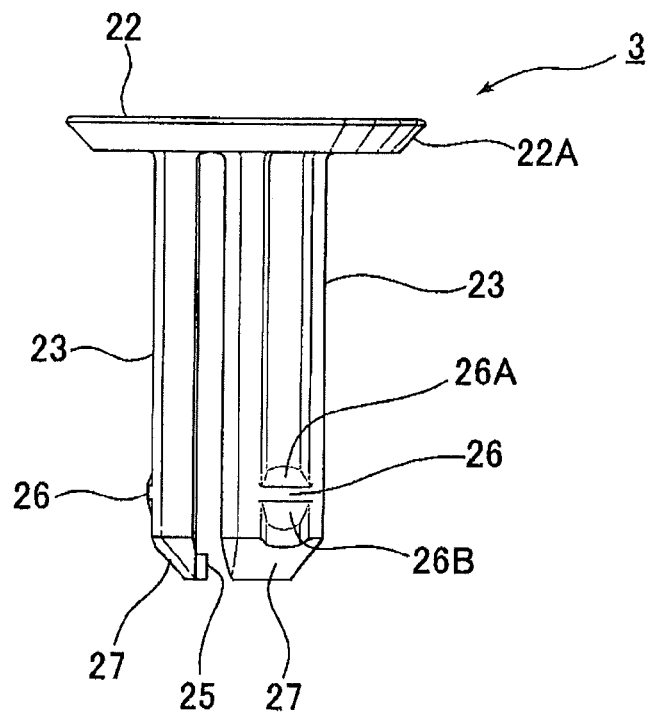
FIG. 7 is a front elevation of the pin diagrammed in FIG. 6.
Figure 8:
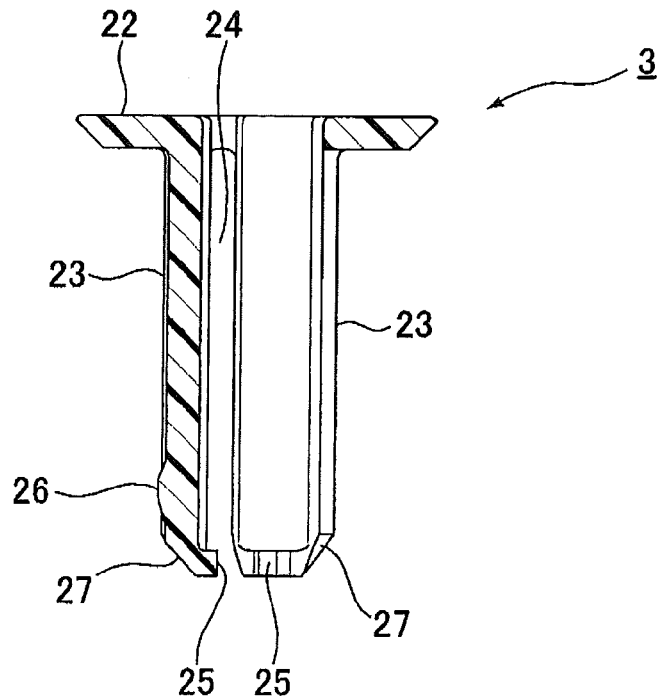
FIG. 8 is a section of the pin, at the E-E line, diagrammed in FIG. 6.

The clip 1 as diagrammed in FIG. 13, for example, in order to mutually couple the first member being attached to 5 and second member being attached to 6, is configured of the bushing 2 diagrammed in FIGS. 1 to 5 and the pin 3 diagrammed in FIGS. 6 to 8, thereby becoming a clip 1 where the pin 3 is temporarily coupled to the bushing 2, and it is delivered to the user in such condition. When the clip 1 is in the temporarily coupled condition diagrammed in FIGS. 9 to 11, the bushing is inserted into the members being attached to, and the pin is inserted further into the bushing, resulting in the permanently coupled condition diagrammed in FIG. 13; the first member being attached to 5 and second member being attached to 6 are then mutually coupled.

The bushing 2 shall now be described with reference to FIGS. 1 to 5. The bushing 2 has a circular bushing flange 7 and a bushing leg 9 of smaller diameter than the bushing flange 7 that descends from the bushing flange 7. In the bushing flange 7 and bushing leg 9, three pin leg through holes 10 and pin acceptance cavities 11 for accepting pin legs 23, respectively, into which the pin 3 has been severally divided (into 3 parts) so as to match the number (3) of the pin legs 23. The pin leg through holes 10 have restraining side walls so that the pin legs 23 inserted therein will not deform to the outside in the radial direction. At the tip end of the bushing leg 9 (the lower end in FIG. 1 and FIGS. 3 to 5), three leg spreaders 13 are formed to match the number of the pin legs 23. The leg spreaders 13 force the pin legs 23 that are inserted into the bushing leg 9 into a diametrically spread condition at the tip end of the bushing leg 9. For that purpose, in the leg spreaders 13, pin open-leg guides 14 are formed, each of which having a diagonal surface protruding diagonally outwardly in the radial direction and toward the tip ends, so as to force the pin legs 23 into a diametrically spread condition. Moreover, in the portion of the leg spreaders 13 where the open leg portion reaches maximum diameter—a position at the tip end of the bushing leg 9—permanent fastening projections 15 are formed for engaging pawl-shaped first locks 25 formed at the tip ends of the pin legs 23. Three permanent fastening projections 15 are formed to match the amount of the three pin legs 23. The pin leg acceptance cavities 11 of the bushing leg 9 may be of any shape so long as they will accept the pin legs 23 that are inserted. In the shapes for those cavities are represented in the drawings as diagrammed in FIGS. 1 and 2, they have substantially triangular cross-sections and extend from positions adjacent to the bushing flange 7 to the permanent fastening projections 15 at the tip ends of the bushing leg 9. The core portion 9A of the bushing leg 9 (cf. FIG. 5) is not a pin leg acceptance cavity but rather is solid (non-hollow), so as to maintain the rigidity of the bushing leg. The tip end of the bushing leg 9 (i.e., the lower end in FIG. 1 and FIGS. 3 to 5) constitutes a solid rigid body in the portion comprising the three leg spreaders 13, thereby maintaining high rigidity. The tip ends of the leg spreaders 13 at the tip end of the bushing leg 9 are formed so as to be tapered to facilitate insertion into the attachment holes of the members being attached to.

The bushing flange 7 is formed with a larger diameter than the pin flange 22. In the upper surface of the bushing flange 7, a recess 17 is formed of such diameter and depth as to accept the pin flange 22 and form a gap between the bushing flange and the pin flange 22, into which the tip of a tool such as a screwdriver can be wedged. In the bushing flange 7, as already described, three pin leg through holes 10 are formed, each connecting to a pin acceptance cavity 11 of the bushing leg 9 into which the pin legs 23 are inserted. In each of the pin leg through holes 10, at the entrance (the upper part in FIGS. 1 and 4), a pin leg insertion guide 18 is formed to facilitate insertion of the pin legs 23 into the pin leg through holes 10. Moreover, the pin leg insertion guides 18, even when the pin legs 23 are deformed in a diametrically spread condition by deformation resulting from stress relaxation, guide the insertion of the pin legs 23 into the pin leg through holes 10 and, by so doing, constrain the pin legs 23 to reassume the unused condition prior to deformation.

Figure 1:
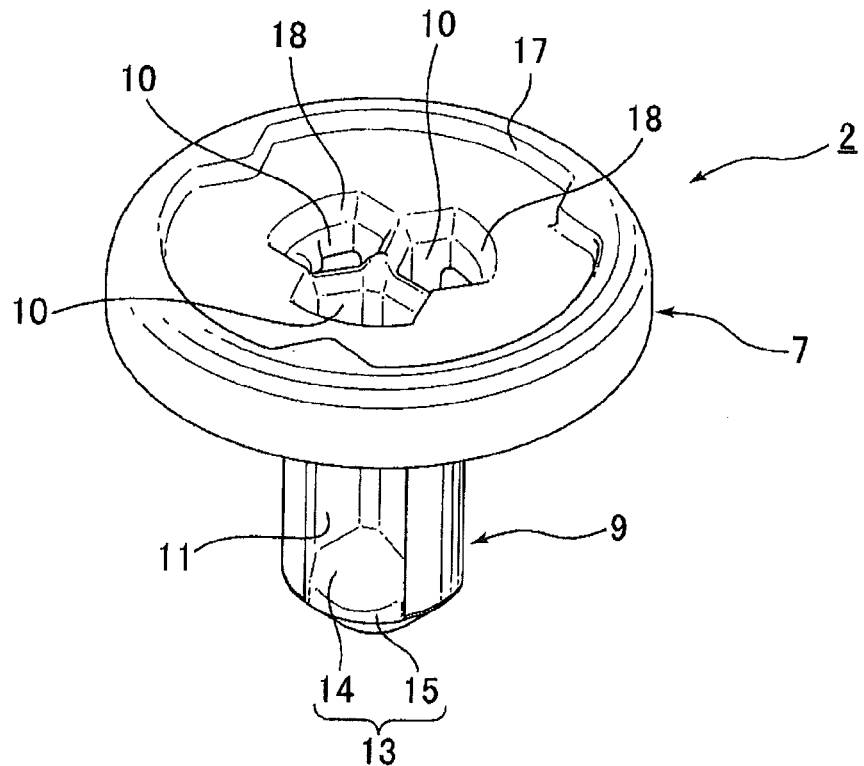
FIG. 1 is a diagonal view of a bushing in a clip relating to one embodiment of the present invention.
Figure 2:
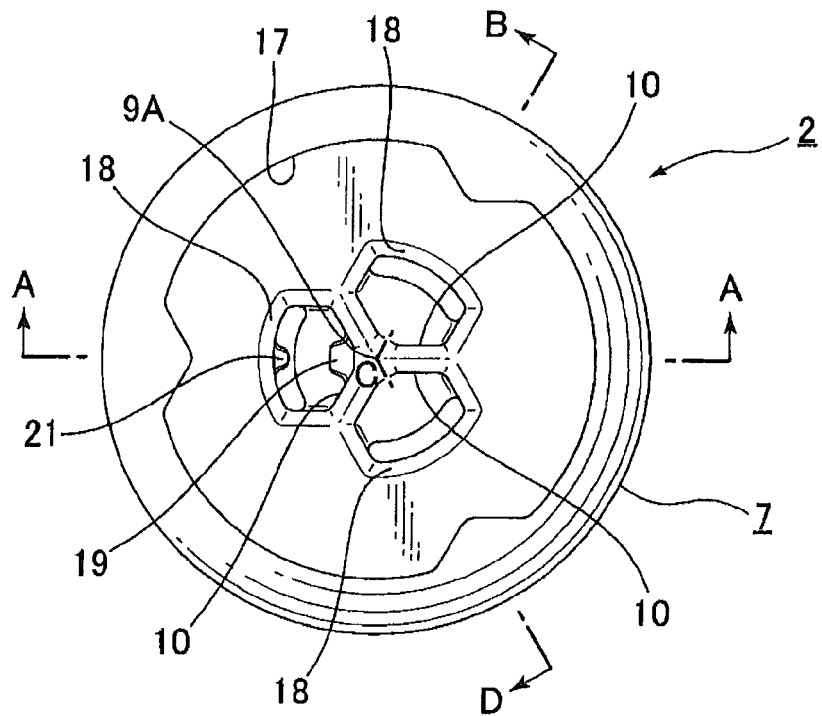
FIG. 2 is a plan of the bushing diagrammed in FIG. 1.
Figure 3:
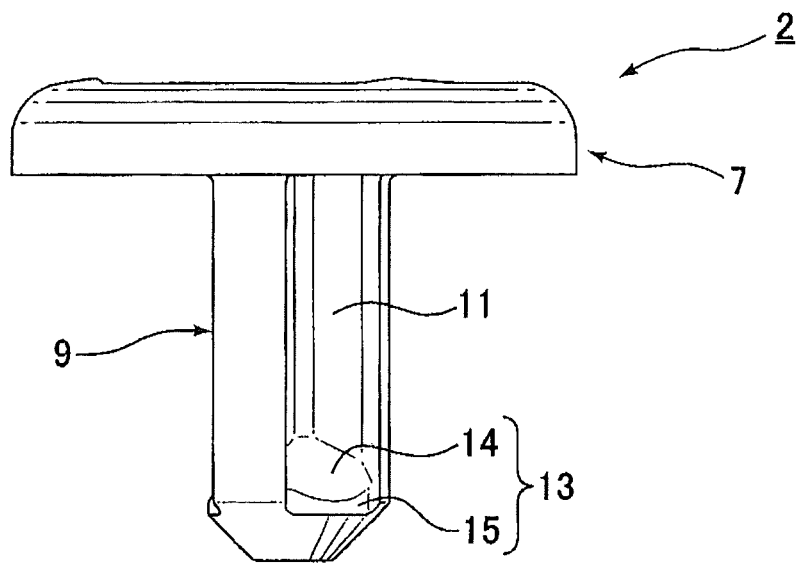
FIG. 3 is a front elevation of the bushing diagrammed in FIG. 1.

Furthermore, in the pin leg through holes 10 as diagrammed in FIGS. 2 and 4, at the exits (lower parts in FIGS. 1 and 4), a temporary fastening maintaining projection 19 and temporary fastening projection 21 are formed for the purpose of temporarily coupling the pin 3 and bushing 2. In the embodiment diagrammed, when a plurality (three) of the pin legs 23 is inserted into the pin leg through holes 10, there is a possibility that the temporary fastening maintaining projections 19 and temporary fastening projections 21 will resist such insertion. For that reason, the temporary fastening maintaining projection 19 and temporary fastening projection 21 are formed in only one pin leg through hole 10. Nevertheless, such a temporary fastening maintaining projection 19 and temporary fastening projection 21 may also be formed in one more pin leg through hole 10 or even in all of the pin leg through holes 10. The temporary fastening maintaining projection 19, as diagrammed in FIGS. 2 and 4, is formed in a pin leg through hole 10 toward the center of the bushing flange 7 where it effects a temporary coupling for the pin 3 and bushing 2, prevents the pin 3 from being pulled out from the bushing 2 and maintains the delivered product condition (unused condition) of the clip 1 diagrammed in FIG. 10. The temporary fastening projection 21 is formed in that pin leg through hole 10 toward the outer circumference of the bushing flange 7. The temporary fastening projection 21 engages a second lock 26 in the pin legs 23. The temporary fastening projection 21, when the temporary fastening maintaining projection 19 engages a first lock 25 in the pin legs, engages the second lock 26 of the pin legs 23, puts the pin 3 in a temporarily coupled condition relative to the bushing 2 and maintains the clip 1 in the delivered product condition (unused condition) diagrammed in FIG. 10. The temporary fastening projection 21, even when the pin legs 23 are deformed in a diametrically spread condition due to stress relaxation, engages definitely with the second lock 26 of the pin legs 23 and forces the deformation of the diametrically spread condition of the pin legs 23 to return to the original attitude, thereby facilitating the reinsertion of the bushing leg 9 and pin legs 23 and facilitating the fastening operation with the clip 1. The temporary fastening maintaining projection 19 and temporary fastening projection 21 may be in the portion of the pin acceptance cavities 11 that is adjacent to the pin leg through holes 10, so long as the tips of the pin legs 23 are disposed in the vicinity of the exits of the pin leg through holes 10; this will then engage the first lock 25 and second lock 26 of the pin legs 23 so that the pin is temporarily coupled to the bushing 2.

The pin 3, as diagrammed in FIGS. 6 to 8, has a circular pin flange 22 of larger diameter than the pin legs 23 but of smaller diameter than the bushing flange 7 and pin legs 23 that descend from the pin flange 22. The pin flange 22 is of such diameter and thickness as to be accommodated in the recess 17 in the upper surface of the bushing flange 7 and form a gap into which the tip of a tool such as a screwdriver can be wedged. When the pin 3 is inserted in the bushing 2 in the permanently coupled condition, the pin flange comes flush against the bushing flange 7, acting as a stopper that stops further insertion. Furthermore, when the pin 3 is returned from the permanently coupled condition to the temporarily coupled condition, the pin flange 22 forms a gap with the bushing flange 7 into which the tip of a tool such as a screwdriver can be wedged, so as to aid the pulling up of the pin 3, also forming a knob for pulling the pin 3 up thereafter. The lower surface of the outer circumferential edge of the pin flange 22 is formed as a diagonal surface 22A whose radius becomes progressively shorter in the downward direction, as diagrammed in FIG. 7. When the pin flange 22 comes flush against the bushing flange 7, a recess is formed into which the tip of a tool such as a screwdriver can be wedged.

The pin legs 23 are formed so as to descend from the pin flange 22 in a plural number (three in the embodiment diagrammed) so that when the pin 3 is inserted into the bushing 2 in the permanently coupled condition, the tip end (lower end in FIGS. 7 and 8) can diametrically spread outwardly in the radial direction. Between the adjacent pin legs 23 are intervals in the circumferential direction, and each of the pin legs 23 is flexed so as to be independently able to diametrically spread in the radial direction. The center of the plural number of pin legs 23 forms a cavity 24 for accepting the core portion 9A of the bushing leg 9 (FIG. 5). There are three of the pin legs 23 in the embodiment diagrammed but they can be any plural number, such as 2 or 4, for example. When that is the case, the number of the pin leg through holes 10 and pin leg acceptance cavities 11 match the number of pin legs 23.

At the respective tip ends of the pin legs 23, first locks 25 and second locks 26 are formed for latching on projections (15, 19 and 21) in the bushing leg 9. The first locks 25, as diagrammed in FIGS. 7 and 8, are each formed in a latching pawl shape that protrudes toward the centerline of the pin legs 23. These first locks latch on the temporary fastening maintaining projections 19 of the bushing leg 9 and maintain the pin 3 in a temporarily coupled condition with respect to the bushing 2. The first locks also latch on the permanent fastening projections 15 of the bushing leg 9 to maintain the pin 3 in the permanently coupled (fastened) condition with respect to the bushing 2. The tip end of each first lock 25 is formed in a hook shape, as diagrammed in FIG. 8, so as to latch on latching shoulders 19A (FIG. 4) in the temporary fastening maintaining projections 19 of the bushing leg 9 and prevent the pin 3 from falling out from the bushing 2 and from the temporarily coupled condition. Consequently, when the pin 3 is pulled up from the permanently coupled condition relative to the bushing 2 and pulled up as far as the temporarily coupled condition relative to the bushing 2, the bushing 2 is pulled up together with the pin 3 and the entire clip 1 can then be pulled up from the members being attached to.

The second locks 26, as diagrammed in FIG. 7, are formed on the outer surfaces of the pin legs 23 as detents (convexities), each having upper and lower diagonal surfaces 26A and 26B. The second locks 26 latch onto the temporary fastening projections 21 of the bushing leg 9 and help maintain the pin 3 in the temporarily coupled condition relative to the bushing 2. These second locks also cause the tip ends of the pin legs 23 that have been deformed outwardly in the radial direction by stress relaxation to latch onto the temporary fastening projections 21 of the bushing leg 9, thereby forcing the pin legs 23 to the pre-deformation attitude and making reuse (reinsertion) of the pin 3 possible and easy. Moreover, since the second locks 26 are formed as detents with upper and lower diagonal surfaces 26A and 26B, as diagrammed in FIG. 7, they do latch on the temporary fastening projections 21 of the bushing leg 9 but do not impede either the insertion of the pin 3 into the permanently coupled condition relative to the bushing 2 or the insertion of the pin 3 into the temporarily coupled condition relative to the bushing 2.

The tip ends of the pin legs 23 are formed so that said tip ends, at the outer surfaces of the portions formed by the first locks 25, are formed as diagonal surfaces 27 which constitute pin tip guides, in order to facilitate the insertion of the pin legs 23 into the pin leg through holes 10 and pin acceptance cavities 11 of the bushing 2. When the pin 3 is coupled to the bushing 2, these diagonal surfaces 27 are guided by the pin leg insertion guides 18 of the bushing flange 7 (FIGS. 4 and 5), thus facilitating the operation of coupling the pin 3 to the bushing 2.

Figure 9:
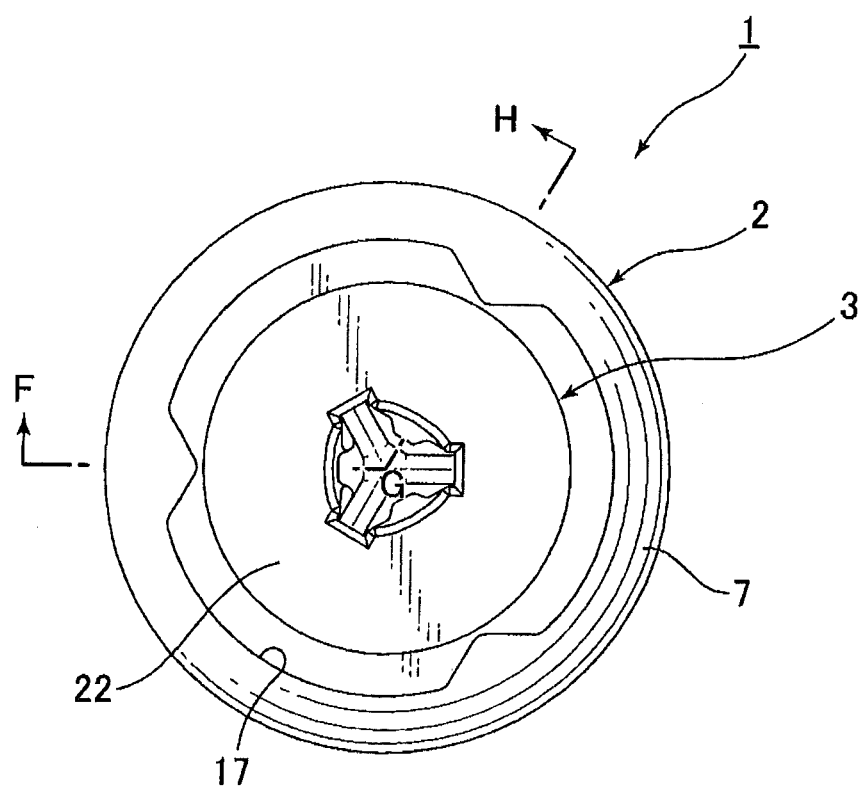
FIG. 9 is a plan of a clip relating to one embodiment of the present invention, wherein the bushing diagrammed in FIG. 2 and the pin diagrammed in FIG. 6 are temporarily coupled.
Figure 10:
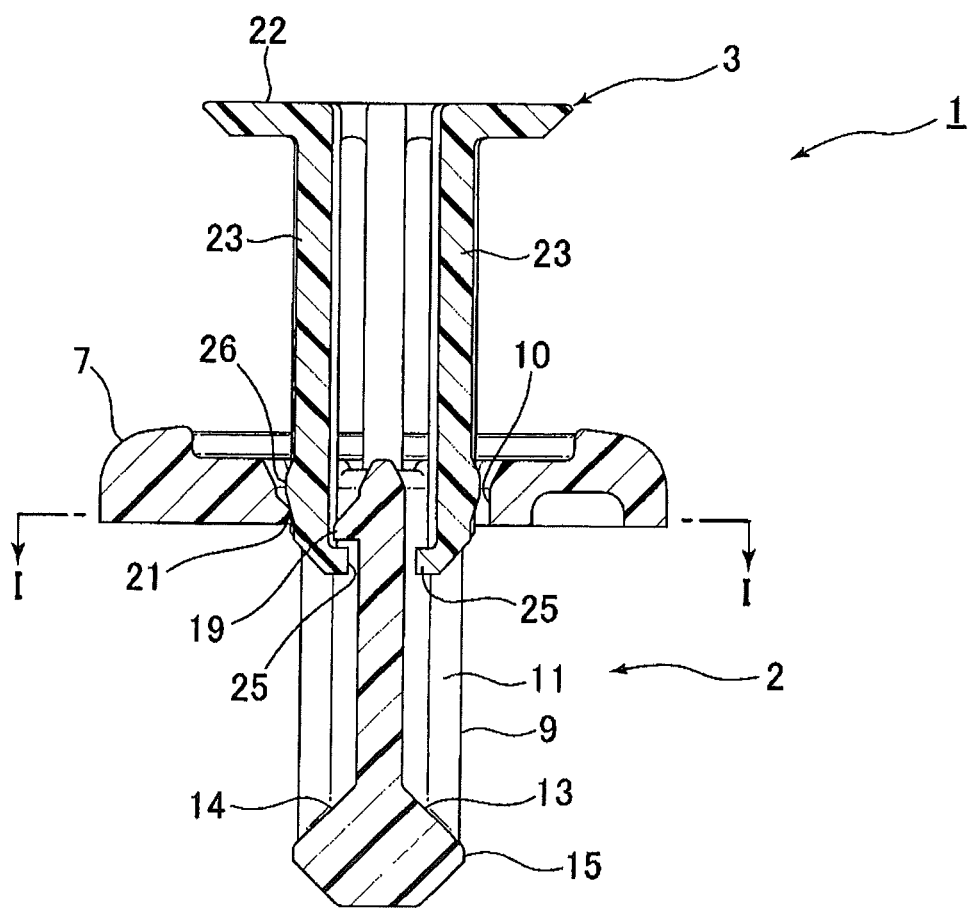
FIG. 10 is a section of the clip, at the F-G-H lines, diagrammed in FIG. 9.

The clip 1 shall now be described with reference to FIGS. 9 to 11. The clip 1, as already described, comprises a bushing 2 and a pin 3 and is used in a condition wherein the pin 3 is coupled to the bushing 2. In FIGS. 9 to 11, the pin 3 is diagrammed in the temporarily coupled condition relative to the bushing 2, which is the product delivery condition of the clip 1, that being also the coupled condition prior to use (fastening) when being coupled to members being attached to. A user of the clip 1 grasps the clip 1 in the temporarily coupled condition diagrammed in FIG. 10, inserts the bushing leg 9 of the bushing 2 into an attachment hole in (a) member(s) being attached to and then further inserts the pin 3 into the bushing 2 to effect the permanently coupled condition diagrammed in FIG. 13, for example; the clip 1 is then fastened to the members being attached to so as to mutually couple a plurality of members being attached to 5 and 6.

When the clip 1 is in the temporarily coupled condition as best represented in FIG. 10, the first locks 25 of the pin legs 23 latch on the temporary fastening maintaining projections 19 of the bushing leg 9, thus preventing the pin 3 from being pulled out from the bushing 2, and the second locks 26 of the pin legs 23 latch on the temporary fastening projections 21 of the bushing leg 9 to maintain the pin 3 in the temporarily coupled condition relative to the bushing 2. When the pin 3 is inserted into the temporarily coupled condition relative to the bushing 2, the respective pin legs 23 are guided into the pin leg through holes 10 of the bushing flange 7 by the pin leg insertion guides 18. Consequently, the pin legs 23 will, respectively, be smoothly inserted into the pin leg through holes 10 not only at the time of initial use when there has been no deformation, but also when deformation has occurred due to stress relaxation so that the pin legs have diametrically spread outwardly in the radial direction. In the temporarily coupled condition, moreover, the second locks 26 of the pin legs 23 latch on the temporary fastening projections 21 of the bushing leg 9 so as to force the diametrically spread deformation outwardly in the radial direction of the pin legs 23 back to the original condition prior to the diametrically spread deformation not only at the time of initial use when there has been no deformation, but also when deformation has occurred due to stress relaxation so that the pin legs have diametrically spread outwardly in the radial direction. Consequently, when being inserted in the permanently coupled condition, the pin legs 23 can be smoothly inserted into the pin acceptance cavities 11 of the bushing leg 9, and no problems will be encountered during the permanent coupling operation.

FIGS. 12 and 13 diagram the clip 1 in the permanently coupled condition. In FIG. 13, with the first member being attached to 5 and second member being attached to 6 in a stacked condition such that the respective attachment holes thereof are aligned, the bushing leg 9 of the clip 1 in the temporarily coupled condition diagrammed in FIG. 10 is inserted into the attachment holes of both members being attached to, and the clip 1 is inserted until the bushing flange 7 comes flush against the first member being attached to 5. After that, the pin 3 is pushed farther into the bushing 2, inserting the pin 3 into the bushing 2 until the pin flange 22 thereof comes flush against the bushing flange 7. By the insertion of the pin legs 23, the tip ends thereof come up against the leg spreaders 13 of the bushing leg 9 and are deformed so as to diametrically spread outwardly in the radial direction. When insertion is complete, the first locks 25 of the pin legs 23 latch onto the permanent fastening projections 15 of the leg spreaders 13 of the bushing leg 9. When the first locks 25 latch on the permanent fastening projections 15, the condition wherein the pin legs 23 are diametrically spread outwardly in the radial direction is maintained as is, and the first member being attached to 5 and second member being attached to 6, as diagrammed in FIG. 13, are clamped between the bushing flange 7 and the diametrically spread portions of the pin legs 23. As described previously, there are three pin legs 23 so that, by the bushing flange 7 and the 3 pin legs 23, the first member being attached to 5 and second member being attached to 6 are mutually coupled. In this way, when the clip 1 is fastened to the first member being attached to 5 and second member being attached to 6, the first member being attached to 5 and second member being attached to 6 are mutually and firmly coupled. FIG. 13 diagrams the fastened condition, that is, the permanently coupled condition, of the clip 1.

The permanently coupled condition diagrammed in FIG. 13 is generally held for a long time, with the pin legs 23 allowed to remain in the diametrically spread condition. After a long period of the permanently coupled condition, during inspection, parts replacement or repair, it is sometimes necessary to remove the first member being attached to 5 from the second member being attached to 6. In order to detach the clip 1 from the members being attached to, it is only necessary to pull the pin 3 up into the temporarily coupled condition diagrammed in FIG. 10. When that is done, the force of deformation outwardly in the radial direction that had been applied to the pin legs 23 from the permanent fastening projections 15 of the leg spreaders 13 will be released, and the force mutually coupling the first member being attached to 5 and second member being attached to 6 will also be released. Consequently, once the pin 3 is pulled up from the bushing 2 into the temporarily coupled condition, the clip 1 can then be detached from the members being attached to 5 and 6, and the first member being attached to 5 can be detached from the second member being attached to 6. After a longlasting permanently coupled condition, due to the "stress relaxation" phenomenon, it often happens that the pin legs 23 cannot return to the original closed leg condition, having been thoroughly deformed in the diametrically spread condition. For this reason, with the pin legs described in Patent Literature 1 or 2, an operation is required to restore the deformation to the original attitude, time and effort are necessary for the refastening job, and reuse and refastening are very difficult.

Figure 14:
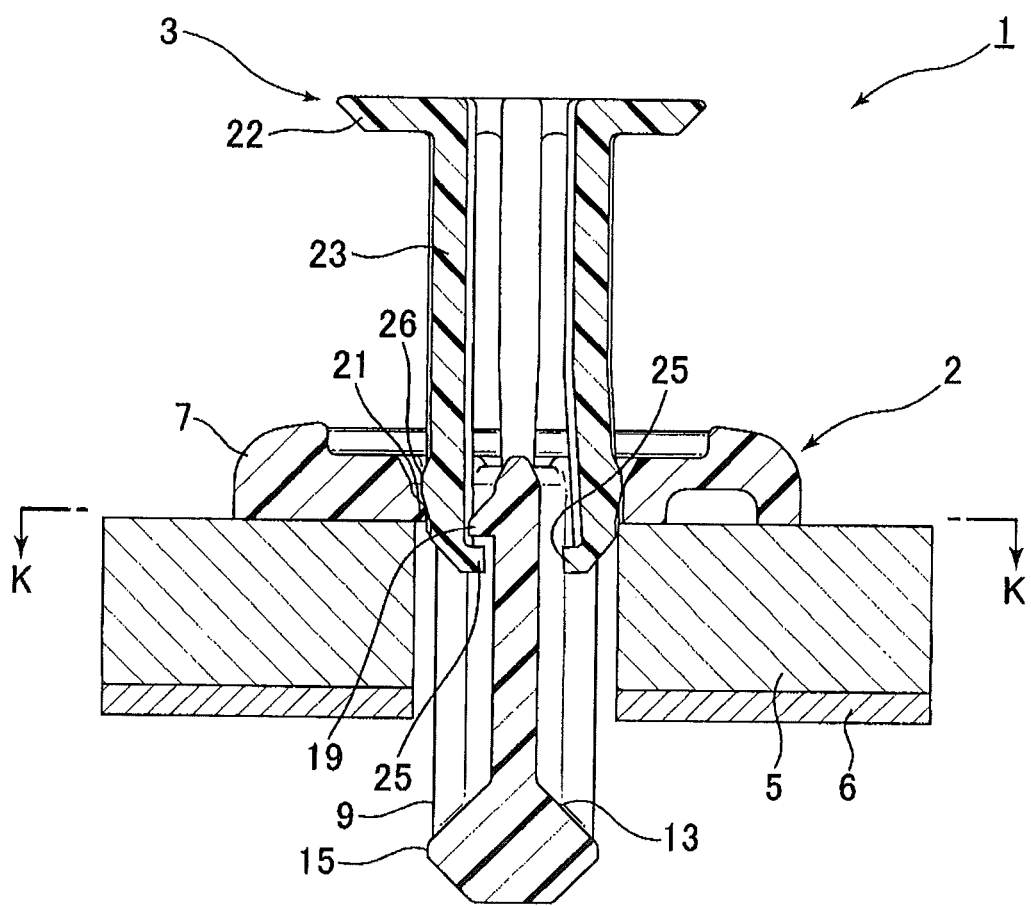
Figure 15:
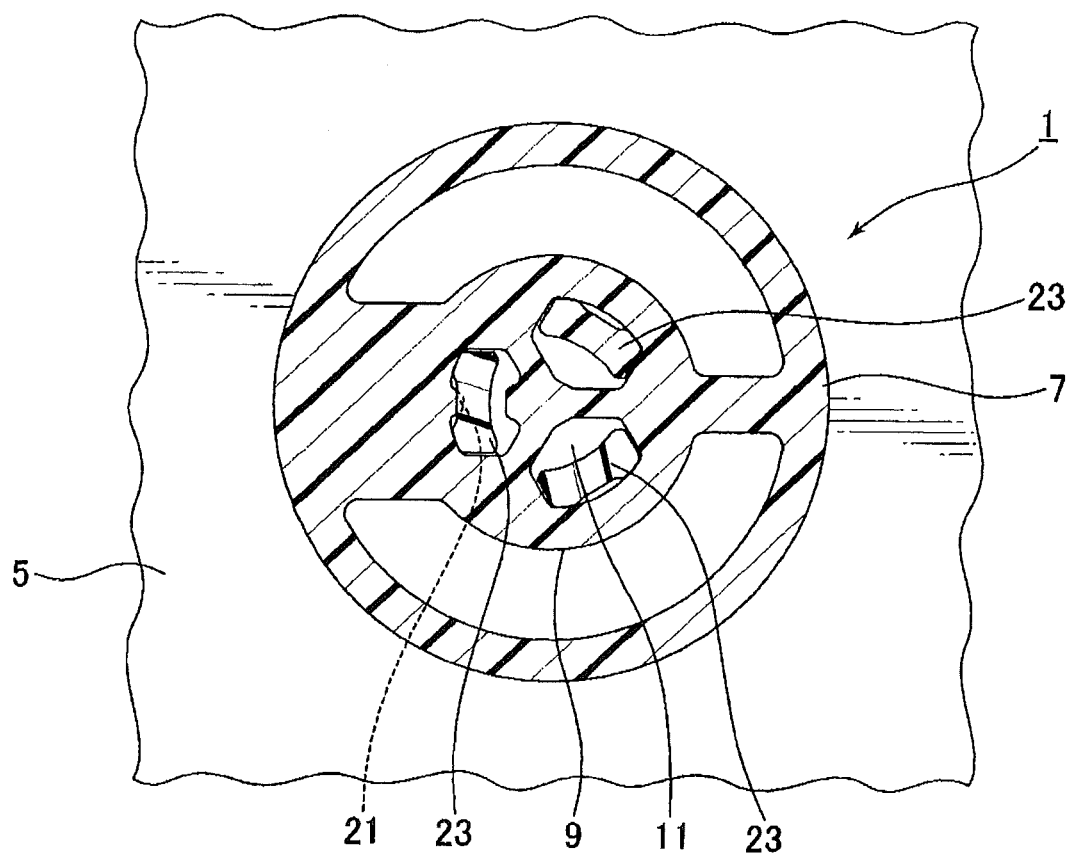
FIG. 15 is a section of the clip at the K-K line, diagrammed in FIG. 14.

However, with the clip 1 of the present invention, even after the pin legs 23 have been completely deformed in the diametrically spread condition by stress relaxation, the refastening operation and, thus, reuse and refastening are facilitated. Further description shall now be given with reference to FIGS. 14 to 17 in addition to FIG. 13. In order to transition from the permanently coupled condition diagrammed in FIG. 13 to the temporarily coupled condition diagrammed in FIG. 14, first when the tip 29 of a tool such as a screwdriver is inserted into the gap between the bushing flange 7 and the pin flange 22 and pried in the direction of the arrow 30, as diagrammed in FIG. 13, the pin 3 will be slightly pulled up from the bushing 2. Subsequently, the pin flange 22 is pulled up from the bushing flange 7 to the position of the temporarily coupled condition as diagrammed in FIG. 14. The temporarily coupled condition diagrammed in FIG. 14 is the same as the temporarily coupled condition of the clip 1 prior to use diagrammed in FIG. 10. That is, the first locks 25 of the pin legs 23 of the pin 3 latch onto the temporary fastening maintaining projections 19 of the bushing leg 9 of the bushing 2, preventing the pin 3 from being pulled out from the bushing 2, and the second locks 26 of the pin legs 23 latch onto the temporary fastening projections 21 of the bushing leg 9 to maintain the pin 3 in the temporarily coupled condition relative to the bushing 2. In the temporarily coupled condition, the second locks 26 of the pin legs 23 are latched onto the temporary fastening projections 21 of the bushing leg 9 such that even when the pin legs 23 are deformed by stress relaxation so they diametrically spread outwardly in the radial direction, the temporary fastening projections 21 and pin leg through holes 10 will force the respective pin legs 23 to reassume the original condition of no diametrically spreading deformation. Accordingly, the clip 1 can easily be pulled out from the first member being attached to and second member being attached to 6, and consequently, the first member being attached to 5 and second member being attached to 6 will be released from the coupling with the clip 1 so that the first member being attached to 5 can be removed from the second member being attached to 6. During reuse of and refastening by the clip 1, with the clip 1 in the temporarily coupled condition as diagrammed in FIG. 14, the second locks 26 of the pin legs 23 will latch on the temporary fastening projections 21 of the bushing leg 9, and the pin legs 23 exhibiting deformation due to stress relaxation will be forced by the temporary fastening projections 21 and pin leg through holes 10 to reassume the original condition of no diametrically spreading deformation. Therefore, the pin 3 can, in that condition, be pushed into the permanently coupled condition relative to the bushing 2. As described previously, even when the tip ends of the pin legs 23 inserted into the pin leg through holes 10 have been deformed so as to diametrically spread outwardly in the radial direction, the temporary fastening projections 21 and pin leg through holes 10 of the bushing flange 7 are formed in shapes whereby the pin legs 23 are forced to flex outwardly in the radial direction, and, when the pin legs 23 in the permanently coupled condition are returned to the temporarily coupled condition position, the tip ends of the pin legs 23 that have been deformed by stress relaxation will be returned to the condition prior to deformation.

Figure 16:
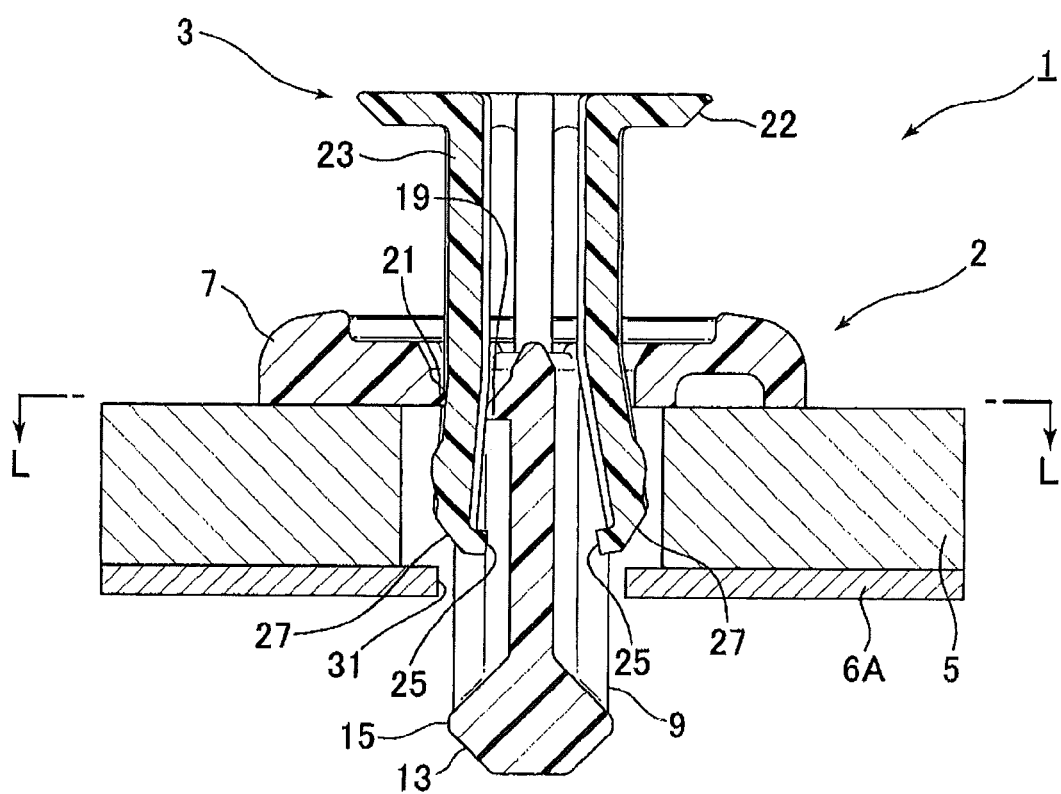
Figure 17:
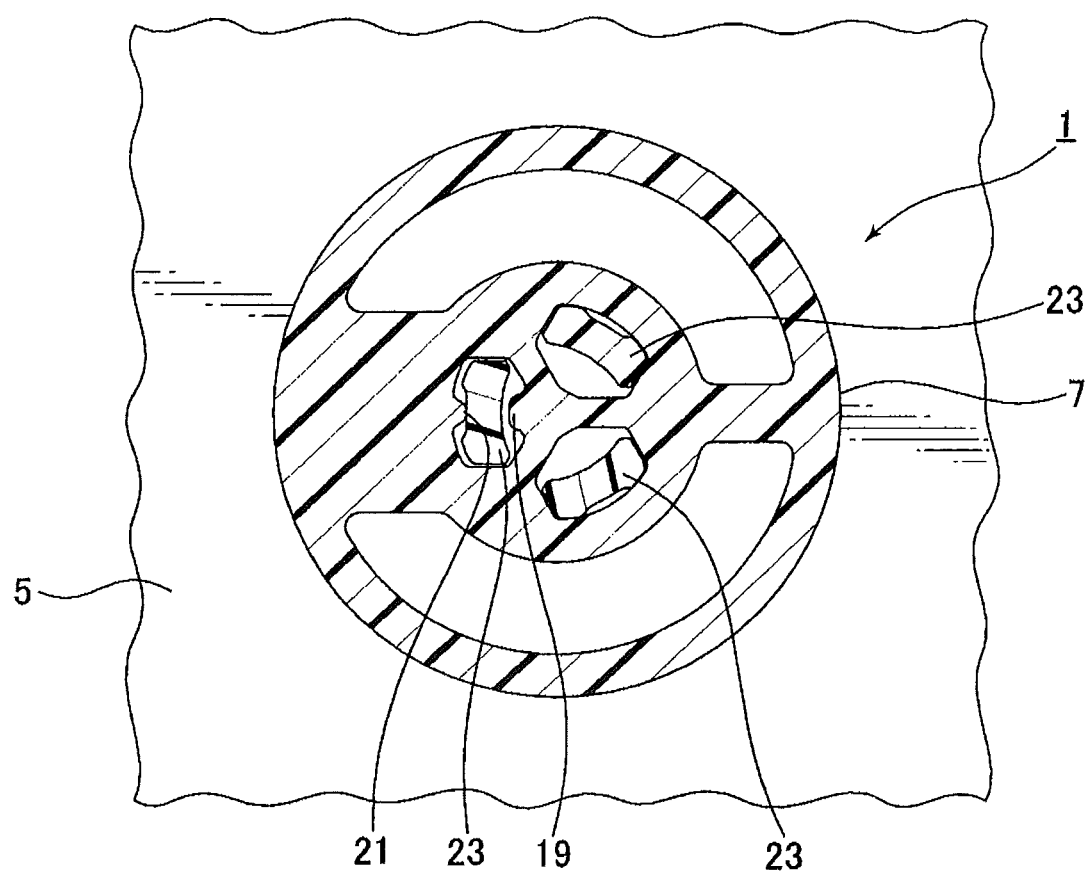
FIG. 17 is a section of the clip at the L-L line, diagrammed in FIG. 16.

FIG. 16 diagrams the manner in which, when the second member being attached to 6A has an attachment hole 31 of smaller diameter than the attachment hole of first member being attached to 5, the clip 1 can be reused. In FIG. 16, the bushing leg 9 of the clip 1 is inserted into the attachment holes of the first member being attached to 5 and second member being attached to 6A, and the pin 3 is pushed slightly into the bushing 2 from the temporarily coupled condition. Even if the attachment hole 30 of the second member being attached to 6A is of smaller diameter than the attachment hole of the first member being attached to 5, the pin legs 23 exhibiting deformation due to stress relaxation will be forced by the temporary fastening projections 21 and pin leg through holes 10 to reassume the original condition wherein there is no diametrically spreading deformation. Also, because the diagonal surfaces 27 are formed in the tip ends of the pin legs 23 so as to form tapered shapes, the pin legs 23 will not be hindered from being pushed in, and the first locks 25 at the tip ends of the pin legs 23 will latch on the permanent fastening projections 15 of the leg spreaders 13 and maintain the permanent coupling.

Furthermore, when the pin legs 23 that are exhibiting deformation due to stress relaxation in the temporarily coupled condition are pulled out from the bushing 2, even when the pin legs 23 are being reinserted so as to couple to the bushing 2, the reinsertion of the pin legs 23 into the bushing 2 can easily be accomplished because the diagonal surfaces 27 are formed at the tip ends of the pin legs 23 so as to form tapered shapes and because the pin leg insertion guides 18 for guiding to the pin leg through holes 10 are formed in the bushing flange 7 of the bushing 2.

It will be appreciated by persons skilled in the art that the above embodiments have been described by way of example only, and not in any limitative sense, and that various alterations and modifications are possible without departure from the scope of the invention as defined by the appended claims.

What is claimed is:

1. A clip operable by hand or with a tool for extending through and for clamping together a first workpiece with a first through-hole and a second workpiece with a second through-hole aligned with the first through-hole; the clip comprising:
    a bushing including a body and a bushing flange, the body extending axially downward from a first end to a second end, and the bushing flange extending radially outward from the first end of the body, and the bushing partially defines an internal cavity extending axially within the bushing, the internal cavity axially open at the first end through a leg hole partially defined by the bushing flange and axially closed at the second end by a leg spreader, and the bushing body includes a first projection extending radially inward into the cavity and a second projection extending radially outward into the cavity, and the second end of the bushing body includes a fastening projection;
    a pin including a pin flange and a leg, the leg extending axially downward from a connected flange end to a free tip end, and the pin flange extending radially outward from the flange end of the leg, and the tip end of the leg is radially spreadable and includes a first lock projecting radially inward, and the leg further includes a second lock projecting radially outward and located axially between the pin flange and the first lock; and
    the pin is located coaxial within the bushing with the pin leg extending axially through the leg hole into the cavity of the bushing body; and the pin is axially movable within the bushing from a temporarily coupled position to a fully coupled position; and
    wherein the temporarily coupled position the tip end of the pin leg is axially proximate to the bushing flange at a radial inward first position inside the bushing body, and the second lock on the pin leg is axially above the first projection in the cavity while the first lock is axially below the second projection in the cavity to prevent unintentional axial movement of the pin;
    wherein the fully coupled position the tip end of the pin leg is axially proximate to the second end of the bushing body and bent by the leg spreader to a radially outward second position outside the bushing body, and the first lock is axially located and engaged below the fastening projection to prevent inadvertent movement of the pin toward the temporarily coupled position.

2. The clip according to claim 1, wherein the leg hole in the bushing flange includes a leg insertion guide, and the leg insertion guide and the first projection act on the pin leg to flex the tip end radially inward; and whereby, when the pin leg is returned to the temporarily coupled position from the fully coupled position, then the tip end of the pin leg which was bent radially outward to the second position is then returned to the radially inward first position.

3. The clip according to claim 2, wherein in the insertion guide is formed for widely opening the entrances of the leg hole and facilitating insertion of the pin leg into the cavity.

4. The clip according to claim 1, wherein the first projection is a temporary fastening projection and the second projection is a temporary fastening maintaining projection, and the temporary fastening projection is located within the internal cavity axially above and radially outward of the temporary fastening maintaining projection and, during movement from the temporarily coupled position to the fully coupled position, then the pin leg may flex radially inward between the temporary fastening projection and the temporary fastening maintaining projection to permit the second lock to move axially below the temporary fastening projection.

5. The clip according to claim 1, wherein the first projection is a temporary fastening projection and the second projection is temporary fastening maintaining projection and the temporary fastening maintenance projection extends radially outward so that when in the temporarily coupled position the radially inward extending first lock on the pin leg tip end latches below the temporary fastening maintenance projection and resists axially upward movement of the pin out from the bushing.

6. The clip according to claim 1, wherein the pin leg is a first pin leg and the pin further includes a second pin leg and a third pin leg arranged circumferentially around the axis of the pin, and the internal cavity is a first internal cavity and the bushing partially defines a second internal cavity and a third internal cavity arranged circumferentially around the axis of the bushing body.

7. The clip according to claim 6, wherein the first lock and the second lock are located on each of the first pin leg, second pin leg and third pin leg, and the temporary fastening maintaining projection and the temporary fastening projection are located in the first cavity.

8. The clip according to claim 1, wherein the bushing flange partially defines a shallow axial recess open in the upward direction and extending radially to accommodate the pin flange flush inside the bushing flange when the pin is in the fully coupled position, and between the bushing flange and the pin flange there is partially defined a radial gap operable for insertion of the tool to lift the pin in the direction of the temporarily coupled position.

* * * * *